3,185,574
HIGH PROTEIN BAKED PIECE AND METHOD OF PRODUCING THE SAME

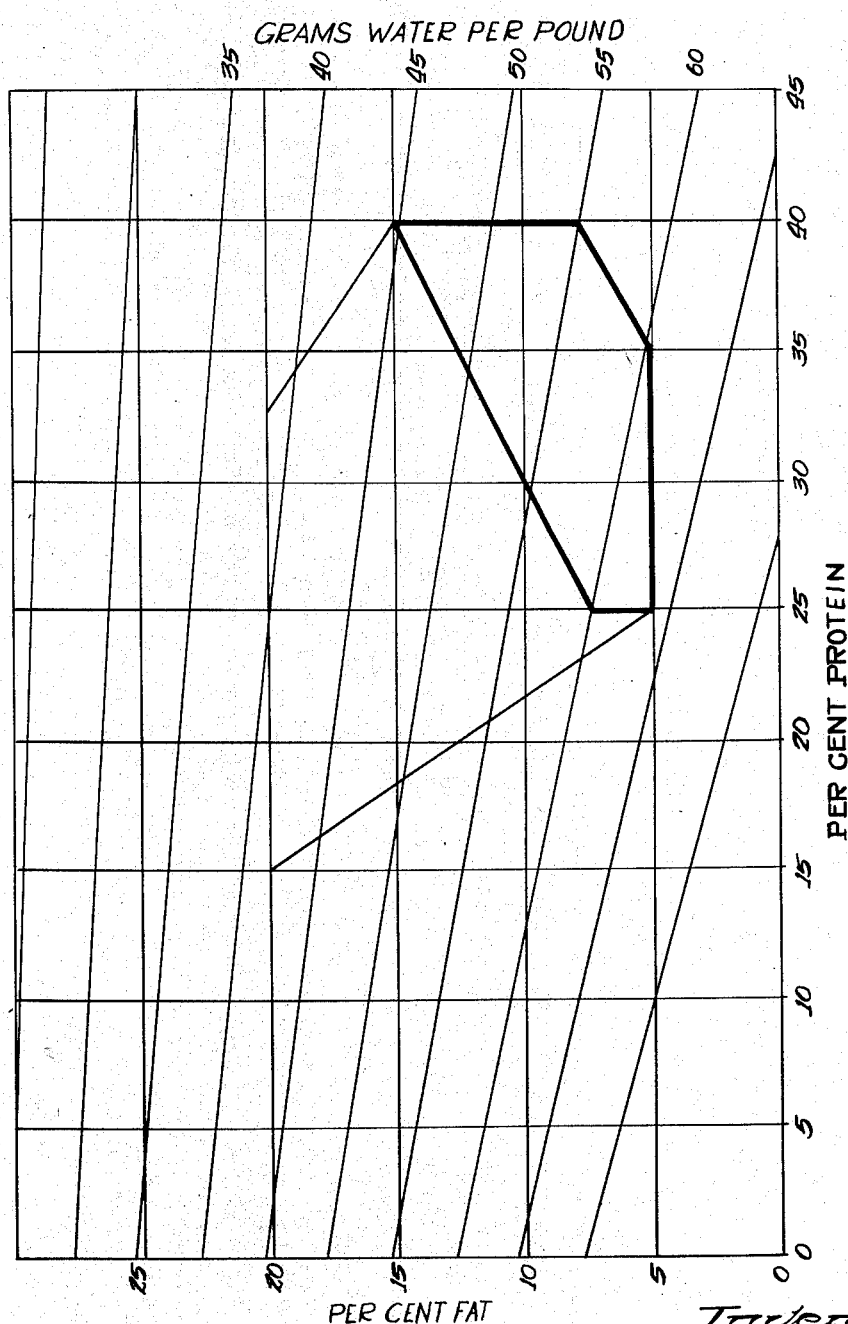

John Lester Gabby and Gerald K. Ashby, Evansville, Ind., assignors to Mead Johnson & Company, Evansville, Ind., a corporation of Indiana
Filed Mar. 21, 1961, Ser. No. 97,275
6 Claims. (Cl. 99—86)

The present invention is concerned with a high protein wafer-like baked piece which contains sufficient protein, carbohydrate, and fat to provide a balanced diet when ingested by a human being in an amount based on the calorie equivalent thereof, and with a process for the manufacture of said baked piece. Preferred baked pieces of this invention embody vitamins and minerals in amounts sufficient so that the wafer-like products may be employed as the sole food. Other preferred forms have unusually low fat contents and are especially adapted for weight control diets.

A number of effective, palatable, nutritionally balanced dietary formulations in the form of liquids and powders comprising mixtures of processed plant and animal proteins, fats, carbohydrates and other ingredients have become available recently for weight control purposes in line with the metered calorie or 900 calorie principle. Such powder and liquid formulations have become well-accepted by large numbers of people.

Such diets, while successful in a high proportion of instances, may become rather monotonous when adhered to for prolonged periods of time, as is sometimes necessary with overweight individuals. In order to provide a varied menu, resort has been had to the preparation of low calorie soups, puddings, ice creams, and dessert-like products from such dietary powders. These efforts have, however, met with only partial success and do not provide a complete solution to the problem of providing variety in the diet. The high protein content necessary to provide a dietary composition which is sufficiently low in caloric equivalent, but yet nutritionally adequate, has prevented the use of such materials in the preparation of cakes, cookies, and other baked items.

It is an object of the present invention to provide a palatable wafer-like baked piece comprised of protein, fat, and carbohydrate, and containing from 15 to 40% by weight of protein.

It is an additional object to provide a baked piece of the nature of a wafer or cookie having a high protein content and supplemented with vitamins and minerals, which closely resembles the above dietary powder and liquid formulations in nutritional composition.

It is a further object to provide such a wafer of uniform size and composition which will permit the individual to substitute a specific number of such wafers for all or a portion of the normally specified daily intake of the equivalent powder or liquid formulation and still maintain his caloric intake below a predetermined limit while receiving a nutritionally balanced diet.

Still another object is to provide a palatable satisfying wafer resembling, for instance, an oatmeal or spice cookie in appearance, consistency, and taste.

Yet another object is to provide a method for the manufacture of such a wafer that is adapted to volume production in standard commercial bakery equipment. These and other objects will be apparent to those skilled in the art from the following disclosure.

The first consideration in formulating a product according to the present invention is to provide a composition which will supply from 58 to 100 g. of dietary protein per day. This amount of protein fulfills the accepted requirement for maintenance of nitrogen balance in an individual depending upon the level of physical activity in which he partakes. Seventy grams per day is considered an average and adequate amount of protein for regular daily intake except for manual laborers who may require more. The present compositions provide this amount of protein in a daily dietary unit of from ½ to 1 lb. of the finished baked pieces.

In order to provide this amount of protein, the present baked pieces contain from 15 to 40% by weight thereof. For wafers adapted for weight losing diets, the amount by weight of fat therein may be as low as 5%. For the preparation of a high calorie wafer for weight gaining regimens, as much as 20% by weight of edible fatty glyceride may be included in the baked piece. In addition, from 5 to 25% the weight of said baked piece is made up of moisture, flavors, fillers, nutritionally inert ingredients, etc. These ingredients, when they include vitamins and minerals, are present in sufficient amounts to provide a nutritionally balanced product and an elegant product. The remainder of the composition is made up of digestible carbohydrate, which in any event comprises at least 35% by weight of the finished baked piece. Preferred compositions of the present invention for weight loss purposes contain on a weight basis from 25 to 40% protein, from 5 to 15% edible fatty glyceride, from 5 to 25% nutritionally inert ingredients, and at least 35% digestible carbohydrate.

The baked pieces of the present invention are thus comprised essentially of closely intermingled particles of protein, fat, digestible carbohydrate, inert ingredients, and preferably vitamin and mineral supplements. They are cemented together to form a wafer-like product with water soaked and dehydrated wheat gluten, as is hereinafter described. The resulting wafer, when containing vitamin and mineral supplements is capable as the sole food of supplying all of the nutritional needs of an adult human being. They are preferably uniform in size so that a specific caloric equivalent for each unit is provided. In this form the present products are uniquely adapted for use in controlled dietary regimens for either weight gaining or weight losing purposes and moreover are adapted for use in combination interchangeably with the liquid or powder-form nutritionally balanced dietary products to which reference has been made above. Animal feeding experiments have shown that the nutritive value, particularly the protein quality, of the finished baked pieces of this invention is higher than that of the total of the ingredients used in their preparation.

It is within the scope of the present invention to bake such wafers in essentially any desired size, but it has been found that a rather thick baked piece (about ½ centimeter) of relatively small diameter (about 5 centimeters), has an appealing appearance and provides about 25 calories per wafer in formulations containing about 9% fat. Wafers of higher caloric content are prepared by increasing the proportion of fat therein, since, on a weight basis, both carbohydrate and protein have appoximately the same caloric equivalent, while that of fat is substantially higher.

The dough components necessary to provide a wafer of the present type have heretofore been considered by those skilled in the art to be incompatible in the proportions necessary to provide a nutritionally balanced wafer having the present composition. This problem has been overcome as a result of the present invention. Water is used as the chief dough lubricant in preparing the present baked pieces, thus eliminating the necessity for employing a dough of high fat content as was previously necessary to prepare high protein wafer-like products. Prior attempts to employ water as the chief dough lubricant in high protein products have failed due to swelling of the protein constituents on contact with the water to form a glue-like mass which is quite unmanageable.

It has now been found that by use in the dough of protein additives of low water solubility, or more accurately low water absorptive characteristics, that water may satisfactorily serve as dough lubricant. Suitable protein additives of low water solubility for use in the present invention include processed animal and vegetable proteins, such as soy protein concentrate, defatted soy flour, defatted cottonseed flour, calcium caseinate, etc.

The protein of the finished wafer is made up of from 3.7 to 20 parts by weigh of wheat gluten per 100 parts by weight of protein in the wafer. The wheat gluten serves the mechanical function of binding the ingredients together. At least 64 parts per 100 parts by weight of said protein is provided by a protein additive of limited water solubility of the type just mentioned and which will be defined more specifically hereinafter. Up to 16 parts per 100 parts by weight of the protein content of the finished baked piece is made up of other protein ingredients which are included not specifically for their contribution to the protein makeup of the product, but rather for other properties which they possess for the purpose of enhancing the physical characteristics of the dough or of the finished wafer. For instance, yeast may be added as a source of vitamins or other nutritional factors. Cottonseed flour may be employed since it enhances the shortening characteristics of the oils in the batter, and egg white if included assists in emulsifying the oil components. Wheat bran may be added to provide an appearance commensurate with the texture of other coarse ingredients employed.

The wheat gluten is preferably supplied as cookie grade wheat flour. It should be noted, however, that various purified wheat gluten preparations are commercially available. These may be substituted on an equivalent protein basis for wheat flour. The wheat gluten thus provides a significant but minor proportion of the protein content of the finished wafer.

It is preferred that approximately one-third of the protein content of the finished wafer be that of an animal source so as to achieve a balanced spectrum of amino acids in the final product to insure its nutritional adequacy. It is well known, of course, that certain vegetable proteins are deficient in one or more specific essential amino acids. By animal protein is meant the protein of meat, fish, milk, or eggs. A highly satisfactory animal protein for use in the present compositions is casein, preferably supplied as the calcium salt.

Calcium caseinate contains approximately 1.5 to 2% calcium on a weight basis, and from 86 to 92% protein. It is prepared by methods known in the art involving, for instance, spray drying of aqueous casein preparations containing ionic calcium in appropriate amount and adjusted to slightly alkaline pH values, e.g. pH 7.6. Calcium caseinate having particle size greater than 100 mesh (U.S. Bureau of Standards sieve size) gives particularly satisfactory results. It has been found, however, that the amount of calcium caseinate should preferably not make up more than about one-half the total protein content of the finished wafer since the physical characteristics and organoleptic qualities of such products are less desirable than those containing from $\frac{1}{3}$ to $\frac{1}{2}$ their protein content on a weight basis as calcium caseinate.

Soy protein concentrate, and defatted soy and cottonseed flours are all satisfactory vegetable protein additives of low water absorptive characteristics for use in the present products. The preferred vegetable protein additive, however, is soy protein concentrate. Soy protein concentrate is a protein-rich fraction of soy beans from which the bulk of the oil, carbohydrate, and other soluble constituents have been removed by extraction with hot lower alkanols, such as methanol, ethanol, or isopropanol. Soy protein concentrate contains about 70% protein (N analysis × 6.25), and 0.5% fat on a dry basis. Suitable products meeting these specifications are available commercially.

The particle size when using soy protein additive may become important. If the particle size is too large, a coarse, undesirable wafer is obtained. If it is too small, the resulting wafer may have a sandy mouth feel and the water absorptive characteristics of the flour are magnified, making it difficult to prepare a moldable dough. The soy protein additive should thus be of such particle size as to pass through a 16 mesh sieve with the major portion thereof remaining on a 60 mesh sieve (U.S. Bureau of Standards sieve sizes are used throughout). That is, the $16/60$ particle size range essentially includes the operable limits for soy protein concentrate as protein additive. A satisfactory but somewhat less desirable product is obtained if the bulk of the soy protein additive has particle sizes in the $40/60$ range. Some people detect a sandy mouth feel when chewing wafers prepared from $40/60$ mesh soy protein additives. The preferred particle size, therefore, when employing soy protein concentrate as protein additive is $16/40$. More finely ground products, say those in the $80/100$ range, have unmanageable water absorptive characteristics, and water cannot serve as primary dough lubricant. Relatively more fat is thus required as dough lubricant and one of the objects of the present invention is thereby defeated.

The protein additive mixture employed in a preferred embodiment hereof is comprised of about 31 parts by weight of calcium caseinate, 60 parts by weight of soy protein concentrate, and 2 parts by weight of defatted cottonseed flour per 100 parts by weight thereof. Use of an amount of defatted cottonseed flour of up to 5% of the finished wafer weight is particularly advantageous since the shortening characteristics of the fatty glyceride components are enhanced.

The fat content of the finished wafer is within the range 5% to 20% by weight, and the protein content thereof 15% to 40%. Both of these amounts are related to the amount of water to be used in preparing the dough in the course of manufacturing the present wafers according to the method of this invention as is hereinafter explained. The fat content is preferably provided by a mixture of three parts by weight of coconut oil and seven parts by weight of corn oil, not considering the minor contribution to the fat content provided by other ingredients, such as the flavors, vitamins, etc.

From 5 to 25% the weight of the finished baked piece is made up of ingredients which cannot be classified as proteins, fats or carbohydrates. This class of materials includes the vitamins and minerals which are added to provide a nutritionally adequate and balanced product. It also includes the fibrous constituents, which usually amount to about 4% the finished wafer weight, and which are inherently associated with the various ingredients, particularly those from cereal sources. It also includes a certain amount of moisture, usually from 3 to 5%, since it is not possible to remove all of the moisture on baking to provide an absolutely anhydrous wafer. Furthermore, such is not to be desired, since about 3% moisture contributes to the tenderness and texture of the finished baked piece. Within the limits of this range other nutritionally inert materials, such as fillers, binders, and extenders, including indigestible material, such as cellulose derivatives, resins, etc. may be included. Flavors and others ingredients including emulsifying agents, sweeteners, salt, etc. desirable for the formation of an elegant baked piece also fall into this category.

The balance of the baked piece is then made up of digestible carbohydrate components. At least about 35% of the finished baked piece weight should be comprised of such components. If a lower proportion of carbohydrate is employed, a crumbly, undesirable baked piece is obtained. Of the digestible carbohydrate content, it is preferred that approximately one-half thereof be sugar, preferably sucrose, and the remainder starch. Suitable sugars include sucrose, fructose, maltose, and dextrose. When from 45 to 55% of the carbohydrate content of the wafer is made up of sugar, it has been found that the resulting product has improved qualities of tenderness and taste. The use of powdered sugar is convenient.

Reference has been made herein to a number of suitable protein additives for preparation of the present baked pieces. A test has been developed for the purpose of evaluating various vegetable and animal protein preparations for their suitability for use in preparation of the present products. Anhydrous acetone 150 ml., is placed in a 250 ml. graduated glass-stoppered mixing cylinder, a 25 g. portion of the dry protein ingredient to be tested is added, the mixture is shaken gently to remove entrapped air, the solid is allowed to settle, and its volume is read and recorded. Water, 100 ml., is added, the cylinder is stoppered, inverted, and shaken for 15 seconds. It is again placed in an upright position and the contents allowed to settle for 5 minutes. The volume reading at the solid-liquid interface is then read and recorded. The ratio of this reading to the dry protein volume reading should not exceed 1.8. It has been found concentrate as protein additive is 16/40. More finely ground products, say those in the 80/100 range, have unmanageable water absorptive characteristics, and water cannot serve as primary dough lubricant. Relatively more fat is thus required as dough lubricant and one of the objects of the present invention is thereby defeated.

decomposition if not handled according to procedures accepted by the baking industry.

The third step involves adding the protein additive of low water solubility described above to the batter-like fluid of step 2 and mixing just sufficiently to provide a homogeneous, moldable dough. Five or six minutes of mixing is usually sufficient. Molded dough units are then formed and baked in the usual fashion, e.g. 4 to 8 minutes at 370 to 420° F., as the fourth and final step.

The weight of water referred to in the second step above is empirically predetermined by routine experimentation so that just sufficient is employed to provide a moldable dough. It will be found that if insufficient water has been used in forming the batter in step 2 prior to mixing in the protein additive in step 3, a crumbly, dry mixture is obtained rather than a moldable dough. A second trial batch is then prepared using a somewhat larger proportion of water until the proper balance is obtained.

When somewhat too much water has been used in step 2 to permit formation of a dough in step 3, a sticky mixture is obtained which cannot be molded. This difficulty can sometimes be remedied by allowing the mixture to stand for a period at room temperature until the excess water has been absorbed by the protein additive. This period should not exceed about one hour, however, since excessive hydration of the proteins occurs, resulting in

TABLE I

*Protein selection test results*

| Ingredient | Dry volume,[1] ml. | Wet volume,[2] ml. | Ratio (wet/dry) | Baking result |
|---|---|---|---|---|
| Soy protein concentrate, 16/35 mesh. | 42 | 68 | 1.6 | Satisfactory. |
| Soy protein concentrate 40/60 mesh. | 42 | 74 | 1.8 | Do. |
| Cottonseed grits, 16/40 mesh size. | 44 | 69 | 1.6 | Do. |
| Cottonseed grits, 40/60 mesh size. | 44 | 74 | 1.7 | Do. |
| Sesame meal, 20/40 mesh. | 80 | 192 | 2.4 | Failed to form a moldable dough. |
| Soy protein concentrate, 80/100. | 42 | 88 | 2.1 | Dry, granular dough formed requiring additional water; hard, flinty wafer with rubber bone center resulting on baking. |

[1] 25 g. sample.
[2] Volume of separated solid after agitating 15 seconds with 3:2 (v./v.) acetone:water, and allowing 5 minutes to settle.

Salient features characterizing the process of preparing the novel wafer-like baked pieces of the present invention after selection of the kinds and amounts of ingredients as described above include the order of mixing the ingredients, use of a minimum amount of water in preparing the dough, and timely baking of the wafers once the dough is formed. As is customarily the procedure in wafer or cookie manufacture, the sugar and shortening ingredients are creamed together, as the first step, along with minor constituents such as the lecithin, egg white, salt, flavors, and others. In the present process the vitamins may be incorporated during the creaming operation or in the second step with the wheat gluten. The wheat gluten component, preferably cookie grade wheat flour, and the mineral premix are added to the creamed mixture. A dry, crumbly mixture results to which a predetermined weight of water is added to provide a fluid, batter-like liquid completing the second step. If desired the water may be added to the creamed mixture prior to the wheat gluten and minerals. This offers no advantage, however. Indeed, the second step is preferably conducted by first adding the wheat gluten and minerals since the resulting dry mass may be stored for relatively prolonged periods before mixing with water to form the batter and completion of the process. The batter-like fluid formed after addition of the water is prone to microbial contamination and concomitant a hard, brittle product on baking, or in extreme cases in a dough from which the water cannot be removed under usual baking conditions.

A corollary to this, of course, is that a properly formed dough should be baked within a reasonable time after molding to avoid excessive hydration of the protein. To this end, if the process is to be interrupted prior to baking, it is advisable to withhold adding the protein additive until the baking ovens are ready to receive the molded wafers. Once the protein additive is mixed with the batter-like mass, execution of the remainder of the operation within about one hour is advisible.

The results of a series of experiments of this type which were conducted to determine optimum amounts of water for dough batches having various compositions are graphically arranged in FIGURE 1 attached hereto. FIGURE 1 is a plot on rectangular coordinates with the percent fat, that is edible fatty glyceride, values arranged along the ordinate and the percent protein along the abscissa. These percentages refer to the percent by weight of the edible fatty glyceride and total protein ingredients in the finished baked piece. The numbers positioned along the right hand ordinate are for the purpose of interpolating water amounts for a given dough batch.

The over-lapping geometric figures positioned between the coordinates enclose those fat and protein compositions for wafers included within the present invention. The smaller area outlined in heavy print and enclosed within the larger area encloses the preferred compositions for use in weight losing diets. It will be apparent that the present wafers may contain from 15 to 40% protein by weight and from 5 to 20% fat. The protein and fat limits for the preferred compositions for weight loss are 25 to 40% and 5 to 15%.

It is apparent from inspection of FIGURE 1 that certain fat and protein combinations within these limits do not lend themselves to formation of a satisfactory product. Thus, when the protein content exceeds 35%, the minimum fat content should exceed 5% by 0.5 times the difference between the actual protein content of the baked piece and 35%. When the protein content is less than 25%, the minimum fat content exceeds the 5% value by 1.5 times the numerical difference between the actual protein content of the finished wafer and 25%. As to the maximum fat content of the finished wafer, it is apparent that the maximum value is 20% except when the protein content exceeds 32.5%. The maximum fat content then is less than that figure by 2/3 of the difference between the actual protein content of the baked piece and 32.5%.

The minimum values of fat content for wafer compositions preferred for weight loss coincide with those given above. The maximum values for fat content of such compositions are uniformly less than the above maximum values. For a wafer containing 40% protein, the fat content may range from a minimum of 7.5% to a maximum of 15%, and for the weight loss compositions which contain less than 40% protein the maximum fat content is less than 15% by ½ the difference between 40% and the actual protein content of the finished baked piece.

In employing FIGURE 1 to ascertain the amount of water required to form a dough in preparing baked pieces of the present invention, the fat and protein content of the finished product is selected first. The point on this diagram corresponding to that composition is then located, and the amount of water required is read from the right hand ordinate by following the appropriate skewed line intersecting therewith. It will be found that if the point corresponding to the fat and protein contents falls outside the enclosed area just described, a satisfactory wafer will not be obtained.

A mathematical formula relating the amount of water to be employed in preparing the dough to the fat and protein contents of the finished wafer has been derived. The water and fat variables for a given protein value are related by the following equation in which $y$ represents an amount of water expressed in grams per pound of non-aqueous dough ingredients, and $x$ is the fat content expressed as percent of finished wafer weight:

$$y + ax - b = 0$$

The values expressed by the letters $a$ and $b$ are constants for wafers of given protein composition again expressed as percent by weight of finished wafer. The values of these constants, $a$ and $b$ are determined as follows: to calculate the value of constant $a$, multiply the percent by weight of protein in the finished wafer by the factor 0.0135 and subtract this product from 1.96. The value for $b$ is determined by multiplying the percent by weight protein selected for the finished wafer by the factor 0.469 and subtracting this product from 85.0. The empirical, the graphic, or the formula methods for determining the amount of water needed for a given dough batch may be used interchangeably.

The following examples are provided as specific illustrations of several embodiments of our invention. They are not to be considered as limiting the scope thereof, however. Illustrations are also presented among these examples of the result when certain important aspects of our invention are not adhered to.

EXAMPLE I

A vitamin premix is prepared by blending the following ingredients in a suitable apparatus, e.g. a twin shell blender. The amounts given provide sufficient premix for a 1000 lb. batch of wafers.

| | |
|---|---:|
| Vitamin A _____ million units [1]__ | 17.5 |
| Vitamin D _____ do____ | 1.75 |
| Ascorbic acid _____ g__ | 5000.00 |
| Thiamin mononitrate _____ g__ | 12.00 |
| Riboflavin _____ g__ | 6.60 |
| Niacinamide _____ g__ | 33.00 |
| Pyridoxine hydrochloride _____ g__ | 4.40 |
| Vitamin $B_{12}$ concentrate, 0.1% (w./w.) in gelatin _____ g__ | 4.40 |
| Calcium pantothenate _____ g__ | 24.00 |
| D α-tocopheryl succinate _____ g__ | 18.18 |
| Powdered cane sugar _____ g__ | 1630.38 |

[1] Preferably supplied as a granular gelatin product.

In a similar fashion a mineral premix is prepared from the following ingredients.

| | G. |
|---|---:|
| Calcium phosphate _____ | 2373.50 |
| Potassium phosphate, dibasic _____ | 1911.00 |
| Potassium carbonate _____ | 2240.00 |
| Magnesium carbonate _____ | 1077.00 |
| Ferrous sulfate _____ | 33.60 |
| Manganese sulfate _____ | 12.40 |
| Copper carbonate _____ | 5.60 |

For a 1000 lb. batch of cinnamon-molasses flavored wafers, the following ingredients were weighed and transferred to a horizontal mixer and mixed at high speed to form a cream.

| | |
|---|---|
| Coconut oil _____ | 22 lbs. 8 oz. |
| Corn oil _____ | 52 lbs. 8 oz. |
| Soy lecithin _____ | 6 lbs. |
| Powdered cane sugar _____ | 200 lbs. |
| Vitamin premix _____ | from above. |
| Egg white, spray dried _____ | 8 lbs. 13 oz. |
| Salt, iodized _____ | 8 lbs. 13 oz. |
| Lemon oil, U.S.P. _____ | 1¼ oz. |
| Butter flavor _____ | 10 oz. |
| Vanilla flavor _____ | 2 lbs. |
| Cinnamon, ground _____ | 5 lbs. 10 oz. |

After a smooth cream is formed, the speed of the mixer is reduced, and 238 lbs. of wheat flour is blended into the mass until the batch is homogeneous and dry in appearance.

Ammonium carbonate, 13 lbs. 4 oz., water, 108 lbs., the temperature of which is adjusted to that of the room, and molasses, 82 lbs., is then added and the entire batch mixed to a smooth batter. About 4 to 6 minutes is required.

The following materials are then weighed and added all at once to the batter without previous blending with one another.

| | |
|---|---|
| Wheat bran _____ | 11 lbs. |
| Yeast, torula _____ | 20 lbs. |
| Cottonseed flour _____ | 11 lbs. |
| Mineral premix _____ | from above. |
| Calcium caseinate _____ | 106 lbs. |
| Soy protein concentrate, 10/35 mesh ___ | 254 lbs. |

The batch is then mixed just sufficiently to form a moldable dough, care being taken not to overmix. An additional portion of soy lecithin, 5 lbs., is then added and mixing is continued just long enough to coat the dough with the lecithin.

The dough batch is then transferred to the hopper of a rotary die cookie molding machine and formed into wafer-like pieces. Each piece weighs 0.22 oz. The wafers are baked 4½ minutes in a band oven, for the first half of the cycle at 420° F. and the second at 370° F.

The wafers are packed 36 to a ½ lb. box which provides 900 calories. These wafers contain on a weight basis 30.8% protein (nitrogen analysis multiplied by 6.25)

of which 6.7% is wheat gluten, 54.9% the proteins of soy flour, 2.1% the proteins of cottonseed flour, and the remainder is supplied by the other protein-containing ingredients, 8.8% fat, and 48.5% carbohydrate, 52% of which is sucrose and the balance starch provided by the various cereal ingredients.

EXAMPLE II

Lemon flavored wafers identical in protein, fat, and carbohydrate content to those of Example I, and having The water and ammonium bicarbonate are then added and the mixture beaten to a batter before adding the remaining ingredients.

Each batch of dough is formed into individual pieces of wafer size and baked for 7 minutes in a forced circulation oven at 195° C. The baking time will vary with the construction of the oven, the controlling factor being the rate of heat input. The lecithin is supplied as commercial soft consistency lecithin.

TABLE II

*Dough formulas*

| Wafer composition | Lecithin | Corn oil | Coconut oil | Sugar | Dried egg white | Salt | Wheat flour | Mineral pre-mix | Water | Ammonium bicarbonate | Soy protein concentrate* | Calcium caseinate | Cottonseed flour | Torula yeast | Wheat bran | Comments |
|---|---|---|---|---|---|---|---|---|---|---|---|---|---|---|---|---|
| 5% fat, 25% protein, 62% carbohydrate | 3.5 | 12.0 | 4.5 | 140 | 4.0 | 4.0 | 154 | 8.0 | 64 | 5.0 | 81 | 39 | 5.0 | 9.0 | 5.0 | (1) |
| 5% fat, 35% protein, 51% carbohydrate | 3.5 | 11.3 | 4.2 | 116 | 4.0 | 4.0 | 111 | 8.0 | 60 | 5.0 | 131 | 57 | 5.0 | 9.0 | 5.0 | (2) |
| 7.5% fat, 25% protein, 59% carbohydrate | 3.5 | 19.7 | 7.8 | 135 | 4.0 | 4.0 | 146 | 8.0 | 60 | 5.0 | 82 | 39 | 5.0 | 9.0 | 5.0 | (3) |
| 8% fat, 40% protein, 42% carbohydrate | 3.5 | 21.1 | 8.4 | 96 | 4.0 | 4.0 | 80 | 8.0 | 55 | 5.0 | 158 | 65 | 5.0 | 9.0 | 5.0 | (4) |
| 10% fat, 35% protein, 46% carbohydrate | 3.5 | 27.4 | 11.1 | 105 | 4.0 | 4.0 | 95 | 8.0 | 55 | 5.0 | 133 | 57 | 5.0 | 9.0 | 5.0 | (5) |
| 15% fat, 25% protein, 52% carbohydrate | 3.5 | 43.5 | 18.0 | 117 | 4.0 | 4.0 | 125 | 8.0 | 50 | 5.0 | 85 | 39 | 5.0 | 9.0 | 5.0 | (6) |
| 15% fat, 40% protein, 35% carbohydrate | 3.5 | 43.5 | 18.0 | 80 | 4.0 | 4.0 | 59 | 8.0 | 45 | 5.0 | 161 | 65 | 5.0 | 9.0 | 5.0 | (7) |
| 20% fat, 15% protein, 58% carbohydrate | 3.5 | 59.6 | 24.9 | 131 | 4.0 | 4.0 | 152 | 8.0 | 42 | 5.0 | 36 | 22 | 5.0 | 9.0 | 5.0 | (8) |
| 20% fat, 32.5% protein, 39% carbohydrate | 3.5 | 59.6 | 24.9 | 88 | 4.0 | 4.0 | 76 | 8.0 | 39 | 5.0 | 125 | 52 | 5.0 | 9.0 | 5.0 | (9) |
| 8.8% fat, 30.8% protein, 52% carbohydrate | 3.5 | 25.3 | 10.2 | 121 | 4.0 | 4.0 | 111 | 8.0 | 57 | 5.0 | 115 | 48 | 5.0 | 9.0 | 5.0 | (10) |
| 9% fat, 15% protein, 69% carbohydrate | 3.5 | 24.6 | 9.9 | 155 | 4.0 | 4.0 | 186 | 8.0 | 60 | 5.0 | 32 | 22 | 5.0 | 9.0 | 5.0 | (11) |
| 5% fat, 40% protein, 45% carbohydrate | 3.5 | 11.3 | 4.2 | 103 | 4.0 | 4.0 | 89 | 8.0 | 59 | 5.0 | 157 | 65 | 5.0 | 9.0 | 5.0 | (12) |
| 20% fat, 40% protein, 30% carbohydrate | 3.5 | 59.6 | 24.9 | 69 | 4.0 | 4.0 | 43 | 8.0 | 37 | 5.0 | 163 | 65 | 5.0 | 9.0 | 5.0 | (13) |

¹ This formed a moist, firm dough which was easily rolled and cut. It baked to a fairly hard, fairly brittle wafer.
² This formed a firm, slightly dry, slightly crumbly dough which was easily rolled and cut. It baked to a hard, brittle, very dense wafer.
³ This formed a moist, firm dough which was easy to roll and cut. It baked to a crisp, slightly hard wafer with excellent texture.
⁴ This would not form a dough in the mixer. It was formed by hand into a firm, dry dough which was easily rolled and cut. It baked to a hard, brittle wafer with good edibility and excellent texture.
⁵ This formed a fairly soft dough which was very easily rolled and cut. It baked to a tender, crisp wafer.
⁶ This formed a slightly greasy dough that was a little too soft for easiest handling. It baked to a tender, crisp wafer with excellent texture.
⁷ This formed a firm, slightly crumbly, slightly greasy dough which was fairly easily rolled and cut. It baked to a tender, crisp wafer with excellent texture and edibility.
⁸ This formed a greasy, soft dough which was easily rolled and cut. It baked to a crisp short wafer with excellent edibility.
⁹ This formed a greasy, very soft dough which was fairly easily rolled and cut. It baked to a very tender, very short wafer.
¹⁰ This formed a fairly soft, somewhat sticky dough which was fairly easily rolled and cut. It baked to a crisp wafer with excellent texture and excellent edibility.
¹¹ This formed a dough which was easily rolled and cut, but which provided an unsatisfactory wafer on baking due to excessive internal cavitation resulting in a puffy wafer.
¹² This mixture failed to form a dough.
¹³ This mixture failed to form a dough.
*Soy protein concentrate 16/35 mesh size.

the same caloric equivalent, are prepared as described in that example, but substituting the following for the lemon oil, butter flavor, and vanilla flavor.

Lemon oil, U.S.P. _____ 11 oz.
Butter flavor _____ 7 oz.
Vanilla flavor _____ 2 lbs. 10 oz.

In addition, the formula of Example I is modified by use of 269 lbs. 13 oz. of powdered cane sugar, 135 lbs. 4 oz. of water, rather than the amounts therein specified, and omitting the molasses.

EXAMPLE III

Butter flavored wafers identical in protein, fat, and carbohydrate content to those of Example I and having the same caloric equivalent are prepared by the modified procedure of Example II but substituting 267 lbs. 6 oz. of powdered cane sugar, 14 oz. butter flavor, and 1¼ oz. of lemon flavor for the amounts specified in Example II.

EXAMPLE IV

Wafers of various compositions as to fat, protein, and carbohydrate content within the scope of the present invention are prepared from the ingredients specified in the following table. These formulas are for 1 lb. batches of wafers. For convenience, use of the vitamin premix and flavors has not been specified. They may, however, be included on a proportional basis as indicated in the preceding examples by decreasing the amount of sugar by the weight of flavors and vitamins employed.

The ingredients are added in the order listed in the table reading from left to right. The dry ingredients and the oils are creamed together prior to addition of the wafer.

EXAMPLE V

This example will illustrate the result of not adhering to the order prescribed for mixing the ingredients according to the process of the present invention. In this example the water is added after combining the protein additive with the other dough components rather than before. As in Example IV, use of flavors and vitamins has not been specified for convenience only in conducting the experiment.

The following materials were combined by creaming in a mechanical mixer.

| | G. |
|---|---|
| Lecithin | 3.5 |
| Corn oil | 25.3 |
| Coconut oil | 10.2 |
| Sugar | 121.0 |
| Dried egg white | 4.0 |
| Salt | 4.0 |

The mixing speed was then reduced and the following ingredients blended therewith.

| | G. |
|---|---|
| Wheat flour | 111.0 |
| Mineral premix (Ex. I) | 8.0 |
| Soy protein concentrate, 16/35 mesh size | 115.0 |
| Calcium caseinate | 48.0 |
| Cottonseed flour, defatted | 5.0 |
| Torula yeast | 9.0 |
| Wheat bran | 5.0 |

A crumbly dry mass resulted, not suitable as a dough. An amount of water as calculated from FIGURE 1, 57 g., was added to the mixture and mixing continued. A damp meal rather than a dough formed.

This is the same formulation, including the amount of water employed, as that of entry 10 of Table II, Example IV. In Example IV, the water was added *before* the protein additive components (calcium caseinate, defatted cottonseed flour, and soy protein concentrate) with the highly satisfactory results described therein.

In the present instance, an attempt to improve the texture of the damp mealy mass was made by adding two additional 20 g. portions of water. Thus with a total of 97 g. of water, a mixture barely of the consistency of a dough was obtained which was firm and crumbly, and difficult to roll and cut.

It was necessary to bake it 10 minutes instead of the usual 7 minutes as was used in Example IV.

The resulting baked pieces were hard and brittle around the edges and tough in the center. It was considered an unsatisfactory product.

What is claimed is:

1. A process for the manufacture of an edible, nutritionally balanced wafer-like baked piece comprised on a weight basis of 15 to 40% protein including wheat gluten and edible protein additive of low water solubility, 5 to 20% edible fatty glyceride, and 35% to 65% digestible carbohydrate embodying the combination of steps comprising in sequence: (1) creaming together fatty glyceride and sugar ingredients; (2) forming a batter from resulting creamed mixture by mixing therewith predetermined weight of water and wheat gluten containing ingredient, the amount of said wheat gluten ingredient being sufficient to provide from 3.7 to 20 parts by weight of wheat gluten per 100 parts by weight of protein in finished baked piece; (3) mixing with resulting batter just prior to baking an amount of edible protein additive of low water solubility sufficient to provide at least about 64 parts by weight of protein per 100 parts by weight of protein in finished baked piece; and (4) forming resulting dough into pieces of predetermined size and shape substantially resembling a dessert cookie and baking said pieces, said predetermined amount of water added in step 2 being just sufficient to provide a moldable dough in step 3.

2. The process of claim 1, wherein said predetermined weight of water employed in forming the batter of step 2 is calculated by reference to the equation $y + ax - b = 0$, wherein $y$ is said predetermined weight of water expressed in grams per pound of nonaqueous dough constitutents, $x$ is the weight percent of edible fatty glyceride in finished baked piece, and constants $a$ and $b$ are calculated from the weight percent of protein in the finished baked piece, $a$ being equal to 1.96 minus the product of 0.0135 and the percent by weight of protein and $b$ being 85.0 minus the product of 0.469 and the percent by weight protein.

3. The process of claim 1 wherein step 4 is commenced within a period of one hour after the completion of step 3.

4. The process for the manufacture of an edible wafer-like baked piece comprised on a weight basis of from 15 to 40% protein, including 3.7 to 20 parts wheat gluten and at least 64 parts edible protein additive of low water solubility per 100 parts by weight thereof, from 5 to 20% edible fatty glyceride, and from 35 to 65% digestible carbohydrate which comprises forming a batter of predetermined weight of water and said fatty glyceride and said digestible carbohydrate ingredients; thereafter and just prior to baking mixing said edible protein additive of low water solubility with said batter to form a dough; and forming resulting dough into pieces of predetermined size and shape substantially resembling a dessert cookie, and baking said piece; said predetermined weight of water employed in forming said batter being sufficient to provide a moldable dough after mixing with said edible protein additive of low water solubility.

5. A product prepared by the process of claim 1.

6. A product prepared by the process of claim 4.

References Cited by the Examiner

UNITED STATES PATENTS

| | | |
|---|---|---|
| 882,852 | 3/08 | Wait. |
| 1,356,988 | 10/20 | Johns. |
| 2,524,991 | 10/50 | Renner _____ 99—99 |
| 2,738,277 | 3/56 | Cryns _____ 99—83 |
| 2,895,831 | 7/59 | Zacharia. |

FOREIGN PATENTS

| | | |
|---|---|---|
| 305,217 | 11/29 | Great Britain. |
| 563,170 | 8/44 | Great Britain. |
| 578,856 | 6/59 | Canada. |

OTHER REFERENCES

"Soybean Digest," June 1959, pages 8 and 9.

A. LOUIS MONACELL, *Primary Examiner.*

ABRAHAM WINKELSTEIN, BEATRICE H. STRIZAK, *Examiners.*

UNITED STATES PATENT OFFICE
CERTIFICATE OF CORRECTION

Patent No. 3,185,574  
May 25, 1965

John Lester Gabby et al.

It is hereby certified that error appears in the above numbered patent requiring correction and that the said Letters Patent should read as corrected below.

Column 5, line 20, beginning with "it has been found" strike out all to and including "is thereby defeated." in line 26, same column 5, and insert instead the following:

> It has been found that protein materials which either hydrate and swell to provide a wet/dry ratio exceeding 1.8 or which are so finely divided that they fail to settle to this extent in the five minute period are unlikely to be satisfactory protein additives for the present wafers. The following table contains illustrative data for various protein preparations.

Signed and sealed this 7th day of December 1965.

(SEAL)  
Attest:

ERNEST W. SWIDER  
Attesting Officer

EDWARD J. BRENNER  
Commissioner of Patents